Aug. 20, 1940.    G. S. LANE    2,212,322
BRAKE ADJUSTMENT
Filed May 26, 1936
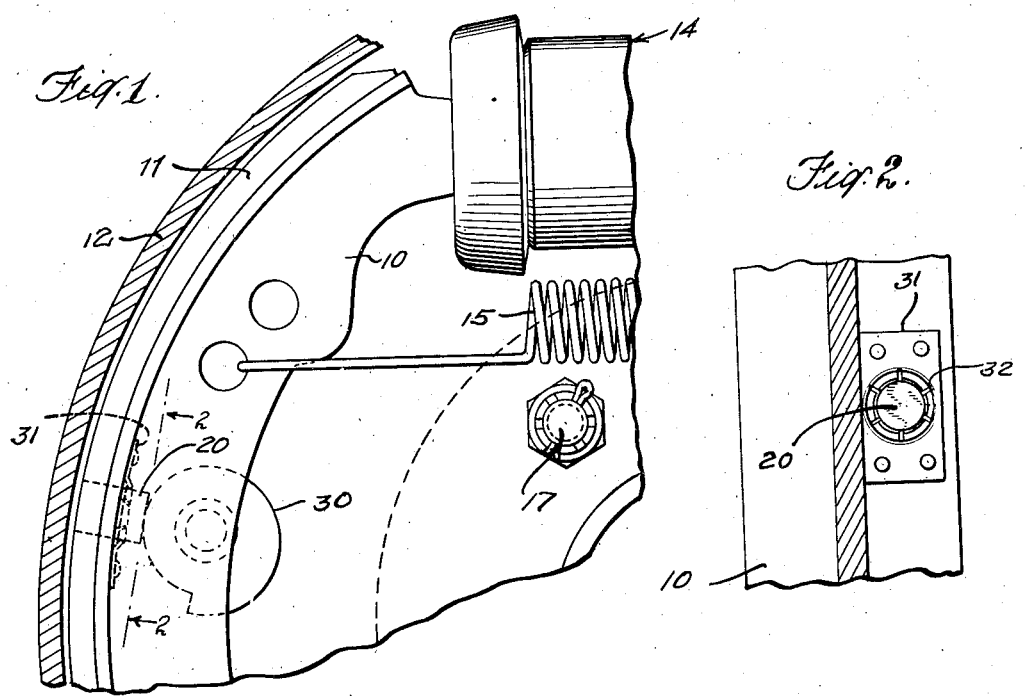
INVENTOR
GEORGE S. LANE
ATTORNEYS Patented Aug. 20, 1940

2,212,322

UNITED STATES PATENT OFFICE 2,212,322

BRAKE ADJUSTMENT

George S. Lane, Schenevus, N. Y.

Application May 26, 1936, Serial No. 81,793

1 Claim. (Cl. 188—79.5)

This invention relates to brakes and more particularly to self-adjusting vehicle braking systems.

In the accompanying drawing I have shown one embodiment of my invention with a view to illustrating the invention and its practical application and explaining the principle thereof, so that others skilled in the art may be enabled to apply it under varying circumstances and conditions. The drawing and following specification are not intended to be exhaustive or limiting of the invention, but rather to enable others to design numerous different embodiments of my invention each particularly suited to the particular requirements for which it is intended.

Fig. 1 is a fragmentary view, partly in elevation and partly in section of a brake drum and brake applying mechanism.

Referring first to Fig. 1, I have there shown a portion of a hydraulically operated braking system such as is now in common use on standard motor vehicles. The brake shoe 10 is a T section arcuate member having a facing 11 thereon of a suitable friction material which is shaped and positioned so as to have a small uniform clearance from the rotating drum 12. In normal practice this clearance varies from about 0.020" to 0.005". The shoe 10 is moved into engagement with the drum 12 by force applied to it from the piston of the brake operating motor 14 and this in turn is provided with fluid under pressure, e. g., from a pedal operated master cylinder and suitable piping connections, not shown herein, but which may, for example, be as shown in my prior applications, Serial Nos. 65,049, 73,703, and 77,225. Upon release of pressure from the motor 14 the shoe 10 is retracted to the released position as shown in Fig. 1 by the retracting spring 15. A spring 19 between the pistons 13 holds them against the shoes 10 when the brake system is in the released condition.

Thus far the construction is entirely according to standard practice and the brake shoe 10 is shown merely as representative of any type of brake device which may be subject to wear, and the brake operating parts 14 and 15 are representative of any brake operating and retracting devices, and particularly of a brake operating device which, like the hydraulic system, is capable of readjusting itself automatically when in the released condition to permit the full return of the pedal or other force applying means and thereby to permit the operating stroke to become effective immediately upon the braking element regardless of its released position.

A feeler or spacer 20 is used in my present invention, for example, as shown in Figs. 1 and 2. While a fixed stop is used it is adjustable by the snail cam 30. In this case an opening is made through the brake shoe adjacent the spiral adjusting cam 30 which, in a present standard construction, forms the limiting stop for retraction of the brake shoe. A ratchet plate 31 is fixed to the back of the shoe 10 surrounding the opening through which the feeler member 20 is extended. This plate 31 is of spring metal and has a circular opening smaller in diameter than the diameter of the feeler 20 and has radial slits 32 forming spring fingers between them which engage the member 20 and hold it against the pressure exerted by the spring 15.

Thus as the brake wears the pressure of the shoe 10 against the brake drum 12 will always bring the outer end of the member 20 substantially flush with the face of the lining 11. The member 20 is made of a length sufficiently less than the distance between the drum 12 and the fixed stop 30 to allow the desired clearance from the drum, e. g., 0.015"; and thus each time the brake shoe 10 is retracted it is held with the face of the lining 11 substantially 0.015" from the inner face of the drum 12, and regardless of wear, since the member 20 will always be pushed down to a position flush with the base of the lining.

In this case it is desirable to have the member 20 wear as little as possible and its material will be chosen with that in view.

In most cases, however, the expansion of the drum due to the frictional heat developed in the braking operation can be compensated for by a corresponding expansion in the stop member 30 and the feeler 20. Thus if aluminum is used as the metal for this stop and the distance between its point of attachment and the point of contact with the feeler 20 is properly related, taking into consideration the co-efficients of thermal expansion of the drum and of the stop member and the relative temperatures attained by the two members, the expansion of the aluminum may be made substantially to compensate for the expansion of the drum and such variations as occur in any normal operation may be absorbed as a slight increase or decrease in the clearance between the lining and the drum without substantially affecting the proper operation of the brake.

I claim:

A braking system having a braking element movable into and away from braking engagement with a brake drum, and a feeler member carried by and projecting through the braking element, means for preventing movement of the feeler member through the braking element toward the drum while allowing it free motion away from the drum, and a stop adapted to engage the feeler member at a fully released position of the braking element, the length of the feeler member between the stop and brake drum being less than the entire distance therebetween measured along its length, and in which the feeler member is of wear-resisting relatively hard material, and the means for preventing its movement toward the drum is a resilient washer slit to form opposing fingers spaced end from end a distance less than the thickness of the feeler member, whereby said fingers act on the feeler member as a silent ratchet.

GEORGE S. LANE.